(12) United States Patent
Herold

(10) Patent No.: US 9,625,054 B2
(45) Date of Patent: Apr. 18, 2017

(54) SHUT-OFF FLAP

(71) Applicant: VAG—Armaturen GmbH, Mannheim (DE)

(72) Inventor: Heribert Herold, Mannheim (DE)

(73) Assignee: VAG—ARMATUREN GMBH, Mannheim (DE)

(*) Notice: Subject to any disclaimer, the term of this patent is extended or adjusted under 35 U.S.C. 154(b) by 0 days.

(21) Appl. No.: 14/722,492

(22) Filed: May 27, 2015

(65) Prior Publication Data
US 2015/0345661 A1    Dec. 3, 2015

(30) Foreign Application Priority Data

May 27, 2014  (DE) .................. 10 2014 107 446

(51) Int. Cl.
- F16K 1/22     (2006.01)
- F16K 47/04    (2006.01)
- F16K 31/12    (2006.01)
- F16L 55/10    (2006.01)
- F16K 1/20     (2006.01)
- F16K 39/02    (2006.01)

(52) U.S. Cl.
CPC .......... F16K 47/045 (2013.01); F16K 1/2014 (2013.01); F16K 1/2028 (2013.01); F16K 1/222 (2013.01); F16K 1/224 (2013.01); F16K 31/12 (2013.01); F16L 55/1018 (2013.01); F16K 39/028 (2013.01)

(58) Field of Classification Search
CPC .......... F16K 1/22; F16K 1/222; F16K 39/028; F16K 47/045; F16L 55/1018

USPC ................................... 251/305–308
See application file for complete search history.

(56) References Cited

U.S. PATENT DOCUMENTS

| | | | |
|---|---|---|---|
| 2,328,736 A * | 9/1943 | Mock | F02D 9/1015 251/118 |
| 2,840,338 A * | 6/1958 | Shaw | F16K 1/226 251/306 |
| 4,005,849 A | 2/1977 | Lorthiois | |
| 4,037,818 A | 7/1977 | Soderberg et al. | |
| 6,929,243 B2 | 8/2005 | Maraud et al. | |

(Continued)

FOREIGN PATENT DOCUMENTS

| | | |
|---|---|---|
| DE | 1217155 B | 5/1966 |
| DE | 2518523 A1 | 11/1975 |
| DE | 10147112 A1 | 4/2003 |

(Continued)

OTHER PUBLICATIONS

Result of Examination Report for German Patent Application No. 10 2014 107 446.7 dated May 27, 2014.

*Primary Examiner* — Mary McManmon
*Assistant Examiner* — Richard K Durden
(74) *Attorney, Agent, or Firm* — Paul D. Bianco; Gary S. Winer; Fleit Gibbons Gutman Bongini & Bianco PL

(57) ABSTRACT

A shut-off flap with a flap-shaped shut-off element, which is supported within a housing in such a way that it can swivel around a rotation axis and which contains a flap disk staggered relative to the rotation axis and lateral hubs to hold two drive shafts which are supported in such a way that they can rotate in the housing. In order to make possible an improvement of the throughflow and a reduction of the actuation torque, flow deflection elements are located on the two hubs.

13 Claims, 4 Drawing Sheets

(56) References Cited

U.S. PATENT DOCUMENTS

2004/0026650 A1 2/2004 Maraud et al.
2004/0051071 A1 3/2004 Ando et al.

FOREIGN PATENT DOCUMENTS

| EP | 1427955 A1 | 6/2004 |
| GB | 1104759 A | 2/1968 |
| GB | 1227334 A | 4/1971 |
| JP | 2013119867 A1 | 6/2013 |
| WO | 03025440 A1 | 3/2003 |

* cited by examiner

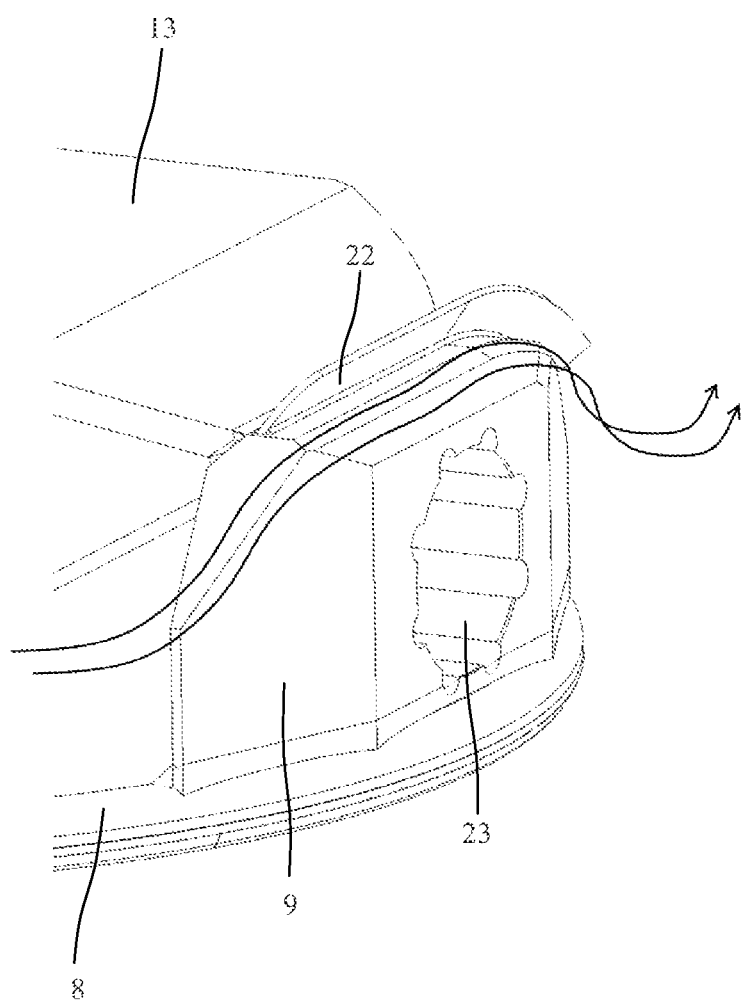

SHUT-OFF FLAP

FIELD OF THE DISCLOSURE

The disclosure relates to a shut-off flap.

BACKGROUND

Shut-off flaps are widely used shut-off elements in water management. In comparison to slide gate valves, flaps are very compact and especially in nominal sizes greater than DN 300, require substantially less installation space. Therefore, pipeline systems with nominal sizes beyond ca. DN 300 are mostly equipped with shut-off flaps. The disadvantage of shut-off flaps is to be found in that the flap disk is located directly in the flow. Since, in the closed position, the flap disk must withstand the differential pressure of the system, the flap disks must be made correspondingly thick, especially for high differential pressures. The greater (thicker) the dimensions of the flap disk, however, the more the throughflow resistance that it opposes against the medium.

From EP 1 427 955 A1 is known a generic shut-off flap with a flap-shaped shut-off element that can swivel around a rotation axis within a housing. In this known shut-off flap, the flap-shaped shut-off element is made in an eccentric construction with a flap disk, staggered relative to the rotation axis, and with lateral hubs to hold drive shafts supported in the housing. With such shut-off elements, the hubs in the flow, however, can produce a wake space, depending on shape and width, which causes vortexes in the outflow area. These vortexes can, on the one hand, increase the wake area and thus increase to total resistance of the shut-off flap and, on the other hand, form vortex fields, which lead to the vibration stimulation of the shut-off flap or of the following pipeline.

SUMMARY

A shut-off flap of the aforementioned type is disclosed, which in at least some embodiments, makes possible an improvement of the throughflow and the reduction of the actuating moment. Appropriate developments and advantageous refinements are also disclosed.

In the disclosed shut-off flap, flow deflection elements are situated on the two hubs. A pressure compensation between the middle of the flap-shaped shut-off element and the wake area behind the hubs can be attained by means of the flow deflection elements; thus, the formation of low pressures and vortexes on the outflow side of the shut-off element can be reduced. Furthermore, the actuation moment for the opening and closing of the shut-off element can also be reduced in this way and the risk of vibrations of the shut-off element and the following pipeline can be diminished.

The flow deflection elements can, for example, be designed in the shape of passages running through the hubs and/or as control bridges on the hubs. With such passages or control bridges, it is possible to suppress the formation of low pressures and vortexes behind the shut-off element in a particularly effective manner.

The passages can be run, in a particularly advantageous manner, from the inside of the flap disk through the hubs to the outside of the flap disk. To reduce the formation of the vortexes, a part of the flow can thus be conducted to the outside of the flap. The passages can be oriented parallel, at right angles, or at another angle to the rotation axis of the shut-off element and thus be situated in the direction of the main flow, or transverse or at an angle to it. With several passages in each hub, the passages can be oriented differently or similarly.

The passages can be appropriately designed in the form of boreholes or slits. However, they can also have another suitable form.

Also, with flow deflection elements in the form of control bridges on the hubs, a flow resistance reduction can be attained. With such control bridges, the fluid flowing through the shut-off flap can be conducted from the inflow side around the hubs and, in this way, a formation of low pressure behind the flap disk can be prevented.

With flaps with a large nominal size or for high differential pressures, the flap-shaped shut-off element appropriately contains a cover plate that is parallel to the flap disk and is connected with it via intermediate bridges at a distance from one another. One or more passages can be provided in the cover plate. In this way, the inflow angle can thus be influenced in such a way that the deflection of the fluid has a reduced influence on the magnitude of the hydraulic moment, and the torque for the opening and closing of the shut-off element can be reduced.

BRIEF DESCRIPTION OF THE DRAWINGS

Other features and advantages of the disclosure can be deduced from the following description of preferred embodiment examples with the aid of the drawing. The figures show the following:

FIG. 7, an enlarged detail view of the support area of a third shut-off flap.

DETAILED DESCRIPTION OF EXEMPLARY EMBODIMENTS

Figure 1:
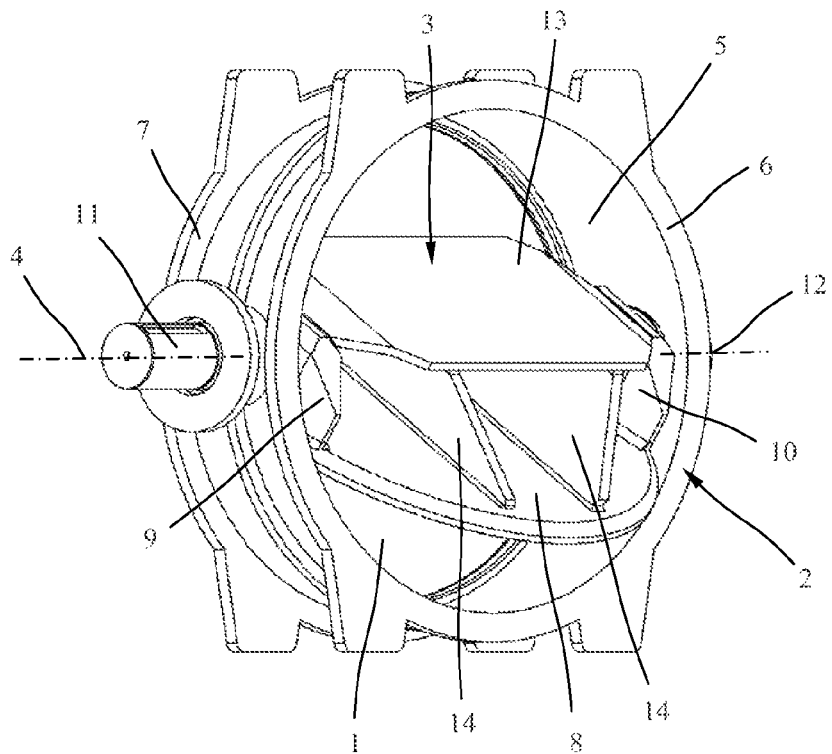
FIG. 1, a first embodiment example of a shut-off flap in one perspective.

The shut-off flap schematically shown in FIG. 1 contains a housing 2, which is provided with a round passage opening 1 and in which a flap-shaped shut-off element 3 is supported so it can swivel around a rotation axis 4 running horizontally, relative to the middle axis of the passage opening 1. The housing 2 has a ring-shaped basic body 5 with a front and back connecting flange 6 and 7 for connection to a pipeline.

The flap-shaped shut-off element 3 is made in an eccentric construction with a flap disk 8 that is staggered with respect to the rotation axis 4 and with lateral hubs 9 and 10 to hold two drive shafts 11 and 12 that are supported in such a way that they can rotate in the housing. By means of the eccentric construction, the sealing system can be relieved in the open position. In the embodiment shown, the shut-off element 3 is made in a reinforced construction with a cover plate 13 that is parallel to the flap disk 8 and is at a distance from it. The cover plate 13 is connected with the flap disk 8 by intermediate bridges 14 that run transverse to the rotation axis 4 and are at a distance from one another. In this way, a rigid but simultaneously flow-favorable construction is made possible, which is particularly advantageous with large nominal sizes and high pressure stages.

Figure 2:
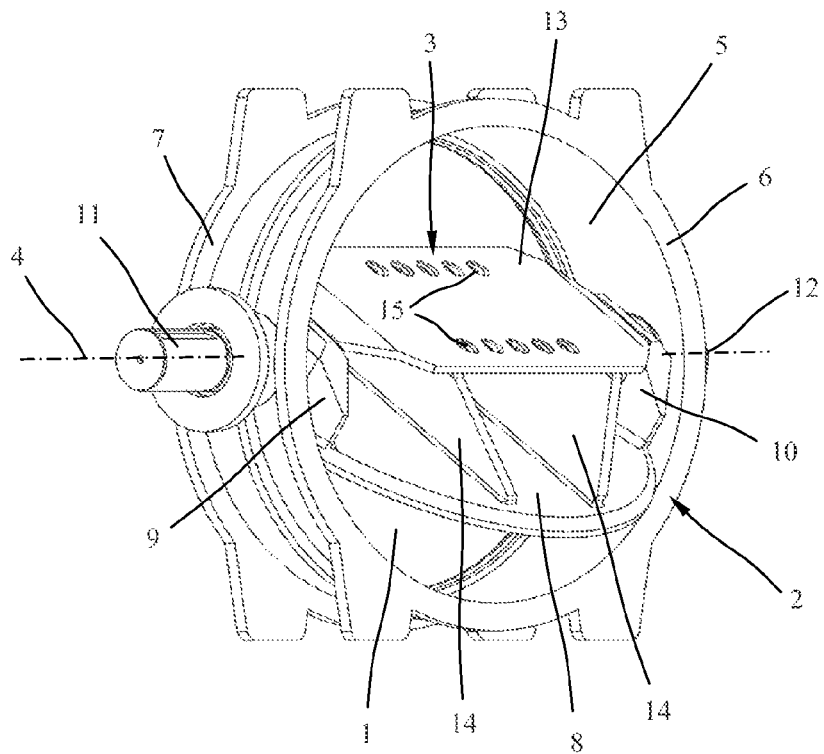
FIG. 2, a second embodiment example of a shut-off flap in one perspective.

FIG. 2 shows another embodiment example of a shut-off flap. In its structure, this shut-off flap essentially corresponds to the shut-off flap of FIG. 1, so components that correspond to one another are also provided with the same reference symbols. The only difference to the shut-off flap of FIG. 1 is to be found in that several circular passages 15 are provided here in cover plate 13. With the passages 15 in the non-pressure-bearing cover plate 13, the low pressure zone in the flow channel can be reduced. Via the passages 15 in the cover plate 13, the inflow angle can also be influenced in such a way that the deflection of the fluid has a reduced influence on the magnitude of the hydraulic torque, and the torque for the opening and closing of the shut-off element 3 can be reduced. The passages 15 can also be made in the form of slits, channels, or the like. Furthermore, only one, for example, slit- or hole-shaped passage can be present in the cover plate 13.

Figure 3:
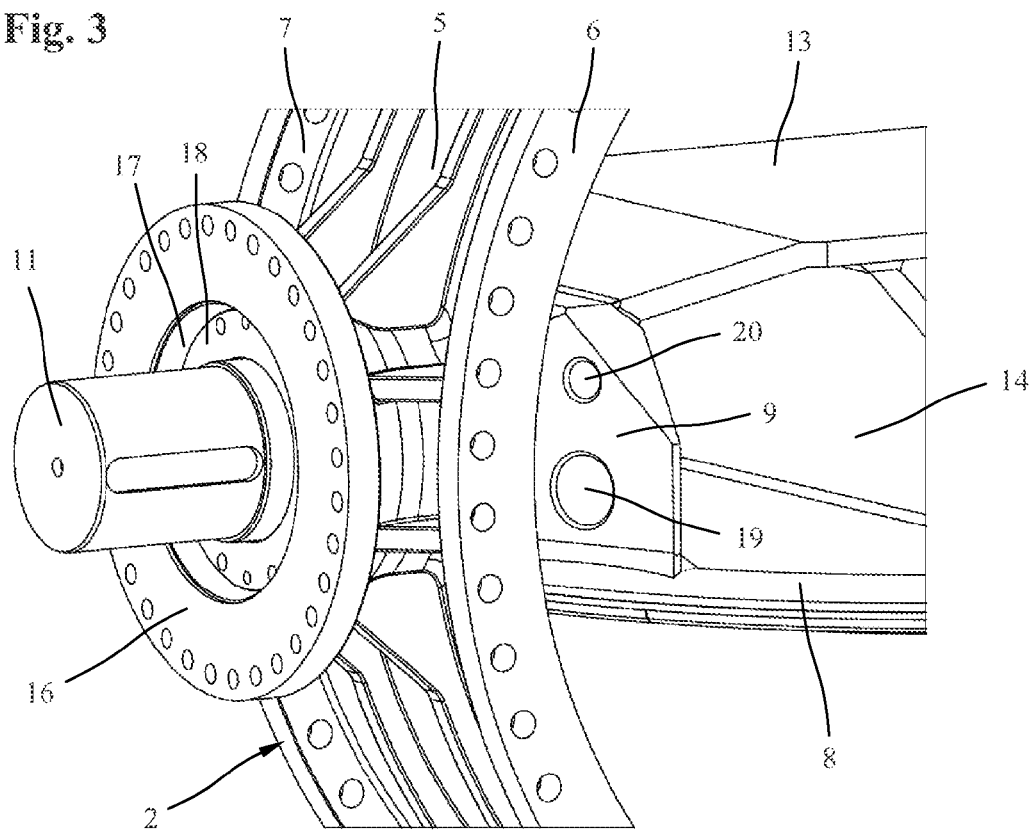
FIG. 3, an enlarged detail view of the support area of a first shut-off flap.
Figure 4:
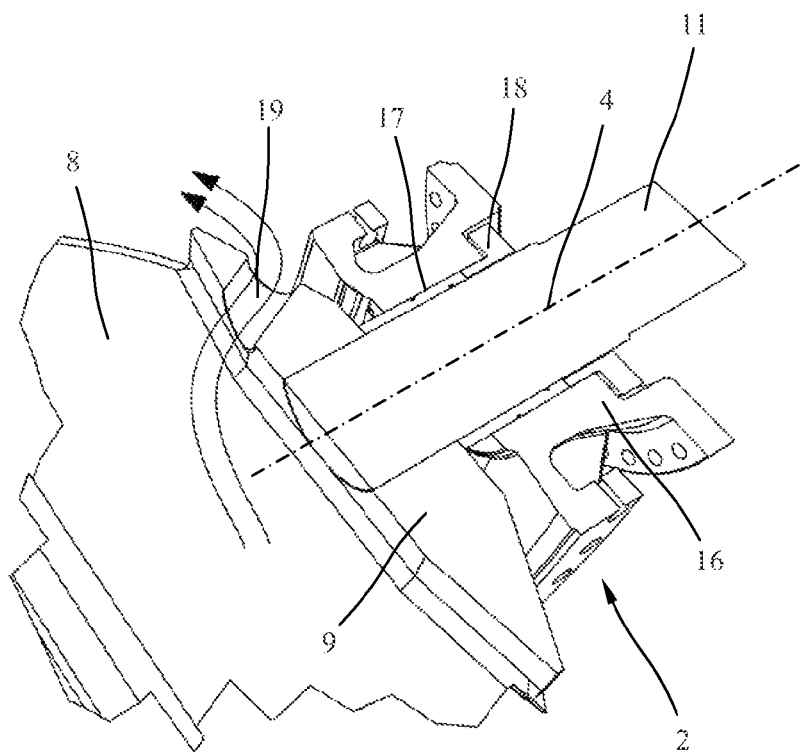
FIG. 4, a sectional view of the support area of FIG. 3.

As can be seen from FIGS. 3 and 4, the housing 2 has two opposite support flanges 16 with support boreholes 17, in which the drive shafts 11 sitting in the hubs 9 and 10 of the flap-shaped shut-off element 3 can be supported in such a way that they can rotate via bearing bushings 18. In depicted hub 9 and non-depicted hub 10 on the opposite side of the shut-off element 3, flow deflection elements for the reduction of the low pressure formation and the reduction of the formation of vortexes are located behind the hubs 9 and 10. In the embodiment example shown in FIGS. 3 and 4, the flow deflection elements are made as boreholes 19 and 20. They are located in the hubs 9 and 10, on the outflow side, in such a way that they run from the inside of the flap disk 8, through the hubs 9 and 10, to the outside of the flap disk 8. In this way, in an open position of the shut-off element 3, a part of the fluid flowing between the flap disk 8 and the cover plate 13 can be conducted to the outside of the flap, as is shown by arrows in FIG. 4.

In the embodiment of FIGS. 3 and 4, several boreholes 19 and 20, oriented at an angle to the rotation axis 4, are provided in hub 9. The boreholes 19 and 20 can have the same or different diameters. They can also be oriented similarly or differently.

Figure 5:
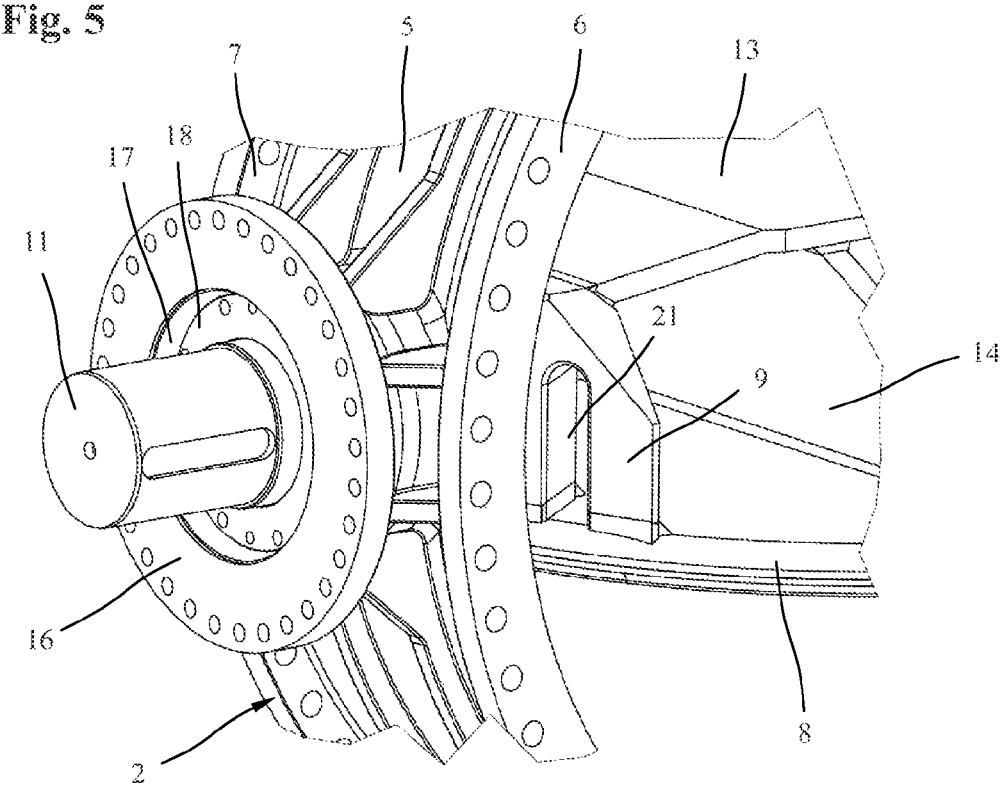
FIG. 5, an enlarged detail view of the support area of a second shut-off flap.
Figure 6:
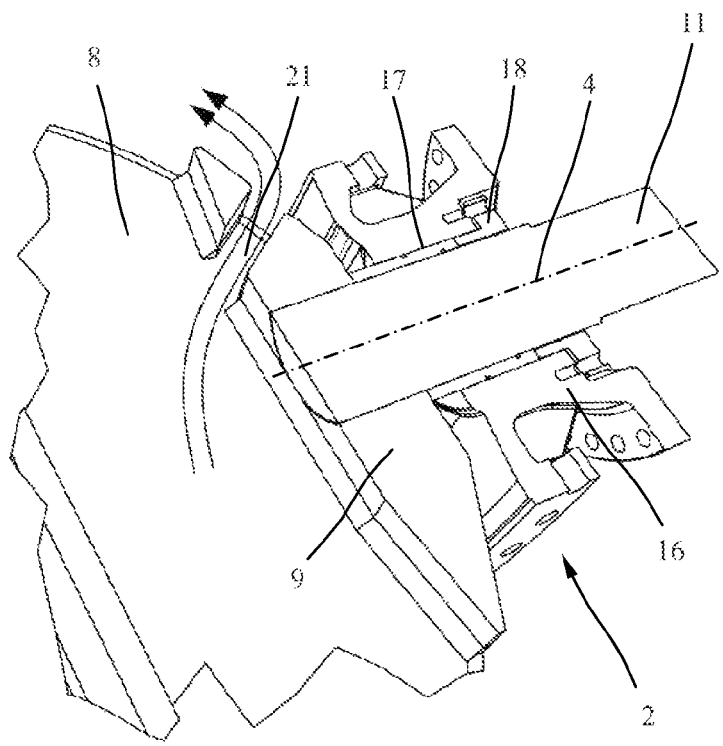
FIG. 6, a sectional view of the support area of FIG. 5.

In FIGS. 5 and 6, another embodiment example of a shut-off flap is shown. In contrast to the embodiment of FIGS. 3 and 4, the flow deflection elements are made as slits 21 here. Also by means of these slits 21, located on the outflow side in the hubs 9 and 10, in an open position of the shut-off element 3, a part of the fluid flowing between the flap disk 8 and the cover plate 13 can be conducted to the outside of the flap, as is shown by the arrows in FIG. 6. Otherwise, this shut-off flap corresponds, in its structure, to a shut-off flap of FIGS. 3 and 4, so components corresponding to one another are also provided with the same reference symbols.

In an embodiment shown in FIG. 7, a control bridge 22, which is made, for example, of sheet metal or integrated in the casting, is located on hub 9. By means of such a control bridge 22, the fluid flowing through the shut-off flap in the area of the hubs can be conducted from the inflow side around hub 9 and, in this way, a low pressure formation behind the flap disk 8 can be avoided. The control bridge can lead downward to the outflow side in the curve around hub 9. The control bridge 22 can be oriented at right angles or under another angle to the rotation axis of the flap disk 8. With an angular arrangement of the control bridge 22, the flow can be given a spin so as to reduce the vortex behind the flap disk 8. A holding borehole 23, which is supplied with a spline profile for a corresponding spline shaft profile of a drive shaft, is provided in hub 9.

What is claimed is:

1. A shut-off flap comprising:
    a housing with an opening;
    a flap-shaped shut-off element supported in the opening so that the flap-shaped shut-off element is swivellable around a rotation axis, the flap-shaped shut-off element having a flap disk staggered relative to the rotation axis, a first lateral hub to hold a first drive shaft, and a second lateral hub to hold a second drive shaft, with the first and second drive shafts supported such that the first and second drive shafts are rotatable in the housing,
    wherein flow deflection elements are located on at least one of the first and second hubs, wherein the flow deflection elements are made as passages running through the at least one of the first and second hubs, and wherein the passages extend completely through the at least one of the first and second hubs from a first side of the at least one of the first and second hubs to a second side of the at least one of the first and second hubs,
    wherein the passages run from an inside of the flap disk through the at least one of the first and second hubs to an outside of the flap disk and wherein, in an open position of the flap-shaped shut-off element, a portion of a fluid flowing over the flap disk is conducted to the outside of the flap disk through the passages.

2. The shut-off flap of claim 1, wherein the flow deflection elements are located on the first and second hubs.

3. The shut-off flap of claim 2, wherein the passages are oriented parallel to the rotation axis of the shut-off element.

4. The shut-off flap of claim 2, wherein the passages are oriented at right angles to the rotation axis of the shut-off element.

5. The shut-off flap of claim 2, wherein the passages include a first passage and a second passage, with the first passage parallel to the second passage.

6. The shut-off flap of claim 2, wherein the passages include a first passage and a second passage, with the first passage not parallel to the second passage.

7. The shut-off flap of claim 2, wherein the passages are in the form of boreholes or in the form of slits.

8. The shut-off flap of claim 2, wherein at least one of the first and second hubs includes a control bridge.

9. The shut-off flap of claim 8, wherein the control bridge is located at a right angle relative to a rotation axis of the flap disk.

10. The shut-off flap of claim 8, wherein the control bridge is located at an angle other than a right angle relative to a rotation axis of the flap disk.

11. The shut-off flap of claim 2, wherein the flap-shaped shut-off element includes a cover plate that is parallel to the flap disk and wherein the cover plate is connected with the flap disk by intermediate bridges.

12. The shut-off flap of claim 11, wherein the cover plate includes at least one cover plate passage.

13. The shut-off flap of claim 12, wherein the at least one cover plate passage is made in the form of a borehole or a slit.

* * * * *